(12) United States Patent
Kalyanasundram

(10) Patent No.: US 10,127,141 B2
(45) Date of Patent: Nov. 13, 2018

(54) ELECTRONIC TECHNOLOGY RESOURCE EVALUATION SYSTEM

(71) Applicant: BANK OF AMERICA CORPORATION, Charlotte, NC (US)

(72) Inventor: Senthil Nathan Kalyanasundram, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 115 days.

(21) Appl. No.: 15/437,327

(22) Filed: Feb. 20, 2017

(65) Prior Publication Data

US 2018/0239692 A1 Aug. 23, 2018

(51) Int. Cl.
*G06F 11/00* (2006.01)
*G06F 11/36* (2006.01)
*G06F 11/30* (2006.01)
*G06F 11/34* (2006.01)

(52) U.S. Cl.
CPC ........ *G06F 11/3664* (2013.01); *G06F 11/302* (2013.01); *G06F 11/3438* (2013.01); *G06F 11/3684* (2013.01); *G06F 11/3688* (2013.01); *G06F 11/3696* (2013.01); *G06F 2201/865* (2013.01)

(58) Field of Classification Search
USPC ........................................................ 714/38.1
See application file for complete search history.

(56) References Cited

U.S. PATENT DOCUMENTS

| | | | |
|---|---|---|---|
| 4,853,851 A | 8/1989 | Horsch | |
| 5,067,129 A | 11/1991 | Evans et al. | |
| 5,671,351 A | 9/1997 | Wild et al. | |
| 5,778,368 A | 7/1998 | Hogan et al. | |
| 6,163,805 A | 12/2000 | Silva et al. | |
| 6,425,096 B1 | 7/2002 | Liese et al. | |
| 6,446,075 B1 | 9/2002 | Velasco | |
| 6,557,120 B1 | 4/2003 | Nicholson et al. | |
| 7,117,484 B2 | 10/2006 | Hartman et al. | |

(Continued)

OTHER PUBLICATIONS

Andres Kull et al., "End-to-End Testing Automation in TTCN-3 environment using Conformiq Qtronic & Elvior MessageMagic", TTCN-3 Users Conference 2009, Asia, Bangalore, India.

(Continued)

*Primary Examiner* — Sarai E Butler
(74) *Attorney, Agent, or Firm* — Michael A. Springs; Moore & Van Allen PLLC; Nicholas C. Russell

(57) ABSTRACT

Embodiments of the present invention relate to apparatuses, systems, methods and computer program products for testing a technology resource application. Specifically, the system typically provides an adaptive application testing framework configured for testing of the technology resource application using multiple testing tool applications, by facilitating portability of test objects associated with the technology resource application across the multiple testing tool applications. In this regard, the system constructs a test object repository comprising one or more test objects. In other aspects, the adaptive application testing framework of the present invention provides a test asset manager interface that facilitates construction, modification, search and management of the test objects and the test object repository in an integrated manner.

20 Claims, 6 Drawing Sheets

(56) References Cited

U.S. PATENT DOCUMENTS

| | | |
|---|---|---|
| 7,287,190 B2 | 10/2007 | Rosenman et al. |
| 7,370,101 B1 | 5/2008 | Lakkapragada et al. |
| 7,496,815 B2 | 2/2009 | Bhaumik et al. |
| 7,689,538 B2 | 3/2010 | Li et al. |
| 7,689,587 B1 | 3/2010 | Tiruveedi et al. |
| 7,694,181 B2 | 4/2010 | Noller et al. |
| 7,797,534 B2 | 9/2010 | Rits |
| 7,823,138 B2 | 10/2010 | Arguelles et al. |
| 7,849,438 B1 | 12/2010 | Hemmat et al. |
| 7,886,284 B2 | 2/2011 | Haven et al. |
| 7,895,565 B1 | 2/2011 | Hudgons et al. |
| 7,925,665 B2 | 4/2011 | Schneider et al. |
| 8,020,044 B2 | 9/2011 | Martinov |
| 8,091,081 B2 | 1/2012 | Thorson et al. |
| 8,091,094 B2 | 1/2012 | Bohle et al. |
| 8,239,835 B2 | 8/2012 | Rex et al. |
| 8,275,586 B2 | 9/2012 | Birch et al. |
| 8,301,413 B2 | 10/2012 | Napolin et al. |
| 8,301,935 B2 | 10/2012 | Martinov |
| 8,434,058 B1 | 4/2013 | Hudgons et al. |
| 8,443,002 B2 | 5/2013 | Chandrasekar et al. |
| 8,862,950 B1 | 10/2014 | Ginsberg et al. |
| 9,075,920 B1 | 7/2015 | Kushnirskiy |
| 9,218,261 B2 | 12/2015 | Holden |
| 9,317,411 B2 | 4/2016 | Kalyanasundram |
| 9,392,012 B2 | 7/2016 | Becker et al. |
| 2002/0104042 A1 | 8/2002 | Wong et al. |
| 2002/0162053 A1 | 10/2002 | Os |
| 2003/0023900 A1 | 1/2003 | Smith et al. |
| 2003/0028826 A1 | 2/2003 | Balluff |
| 2004/0216140 A1 | 10/2004 | Hiltgen |
| 2004/0243381 A1 | 12/2004 | Kuturianu et al. |
| 2005/0102580 A1 | 5/2005 | House et al. |
| 2005/0188262 A1 | 8/2005 | Rosenman et al. |
| 2005/0228644 A1 | 10/2005 | Wang |
| 2005/0235263 A1 | 10/2005 | Bundy |
| 2006/0048005 A1 | 3/2006 | Gollub et al. |
| 2006/0156287 A1 | 7/2006 | Vikram |
| 2006/0236083 A1 | 10/2006 | Fritsch et al. |
| 2006/0265751 A1 | 11/2006 | Cosquer et al. |
| 2007/0220341 A1 | 9/2007 | Apostoloiu et al. |
| 2007/0277154 A1 | 11/2007 | Badwe |
| 2008/0072050 A1 | 3/2008 | Klonover et al. |
| 2008/0120521 A1 | 5/2008 | Poisson et al. |
| 2008/0155334 A1 | 6/2008 | Mills et al. |
| 2008/0163165 A1* | 7/2008 | Shitrit ............... G06F 8/315 |
| | | 717/107 |
| 2008/0229149 A1 | 9/2008 | Penton |
| 2008/0256389 A1 | 10/2008 | Neethiraj et al. |
| 2009/0138856 A1 | 5/2009 | Oja et al. |
| 2009/0187823 A1 | 7/2009 | Farrell et al. |
| 2009/0288070 A1* | 11/2009 | Cohen ............... G06F 11/366 |
| | | 717/125 |
| 2009/0307531 A1 | 12/2009 | Karthikeyan et al. |
| 2009/0307763 A1 | 12/2009 | Rawlins et al. |
| 2012/0030513 A1 | 2/2012 | Peng et al. |
| 2012/0072159 A1 | 3/2012 | Wang |
| 2012/0150820 A1 | 6/2012 | Sankaranarayanan et al. |
| 2012/0203590 A1 | 8/2012 | Deb et al. |
| 2013/0007522 A1 | 1/2013 | Kurapati et al. |
| 2013/0041900 A1 | 2/2013 | McCoy et al. |
| 2013/0042151 A1 | 2/2013 | McCoy et al. |
| 2013/0191919 A1 | 7/2013 | Basavapatna et al. |
| 2013/0305097 A1 | 11/2013 | Arcese et al. |
| 2013/0318402 A1 | 11/2013 | Rapp et al. |
| 2014/0181793 A1 | 6/2014 | Kaliappan |
| 2015/0051863 A1 | 2/2015 | Tsuchida et al. |
| 2015/0066417 A1 | 3/2015 | Kimura et al. |
| 2015/0082322 A1 | 3/2015 | Stribling |
| 2016/0019129 A1* | 1/2016 | Wu ............... G06F 11/3664 |
| | | 702/182 |
| 2017/0308379 A1* | 10/2017 | Busi ............... G06F 8/77 |

OTHER PUBLICATIONS

CA Technologies: Service Virtualization, LISA Service Virtualization for Application Development & Testing, downloaded from <http://www.itko.com/solutions/endtoend_testingfisp.com> on Sep. 18, 2013.

HP Quality Center Enterprise Software Data Sheet, Copyright 2007-2008, 2010-2013 Hewlett-Packard Development Company, L.P., Apr. 2013, 8 pages.

IBM Rational Functional Tester, Copyright IBM Corporation 2008, Jan. 2008, 4 pages.

* cited by examiner

US 10,127,141 B2

ELECTRONIC TECHNOLOGY RESOURCE EVALUATION SYSTEM

FIELD

In general, embodiments of the invention are directed to systems, methods and computer program products for providing testing platforms for evaluation of processing activities, determination of operational and source code defects and failures, and determining program parameters of technology platform applications and programs.

BACKGROUND

With advancements in technology, entities have increasingly embraced a multitude of complex technology platform applications, in an attempt to administer an ever increasing number of information technology operational activities that are necessary for the functioning of the entities. However, testing each of these complex technology platform applications, either manually or using existing systems is challenging, both from technical and feasibility standpoints. Furthermore, entities typically employ multiple testing tools, each operating on different platforms and requiring separate programming and separate test codes for the testing of an application. Accordingly, shifting from one testing tool to another in the present system is extremely time consuming and technically challenging. Thus, there is a need for technical solutions which alleviate the deficiencies of the existing systems and provide novel testing platforms and systems that are configured for integrated testing of technology resource applications using a plurality of testing tools and that facilitate portability of the test codes across carious testing tools.

The previous discussion of the background to the invention is provided for illustrative purposes only and is not an acknowledgement or admission that any of the material referred to is or was part of the common general knowledge as at the priority date of the application.

BRIEF SUMMARY

Embodiments of the present invention address the above needs and/or achieve other advantages by providing a computerized system, and an associated computerized method and computer program product, for systematic data processing and technology configuration. Specifically, the system provides an adaptive application testing framework configured for testing of the technology resource application using multiple testing tool applications by facilitating portability of test objects associated with the technology resource application across the multiple testing tool applications. In some embodiments the system comprises a computer apparatus including at least one processor, at least one memory device and a network communication device. In some embodiments, an adaptive application testing module is stored in the at least one memory device comprising computer readable instructions, that when executed by the at least one processor, cause the at least one processor to: retrieve, from the at least one memory device, a functional feature of a technology resource application stored in the at least one memory device, wherein the functional feature is an operational element of the technology resource application; create one or more test objects associated with the functional feature of the technology resource application, wherein creating the one or more test objects comprises creating a query pointer path for each of the one or more test objects; construct, automatically, a test object repository for the one or more test objects, wherein constructing the test object repository comprises constructing an object repository code, in a test object file, comprising the one or more test objects as nodes in a logical structure of the object repository code, wherein the query pointer paths of the one or more test objects are configured for selection of the nodes within the test object file; construct a first application test script associated with a first testing tool application, wherein the first application test script comprises code for one or more test steps for testing the technology resource application using the first testing tool application, wherein each of the one or more test steps are associated with at least one test object of the one or more test objects for testing the functional features of the technology resource application; determine one or more test data artifacts associated with testing the technology resource application, wherein the one or more test data artifacts are associated with the one or more test objects; and initiate, via the first testing tool application, testing of the technology resource application using the first application test script and the test object repository, wherein testing of the technology resource application comprises executing first application test script by parsing the one or more test objects from the test object repository and the associated test data artifacts into the first application test script based on the one or more test steps to test the technology resource application In some embodiments, or in combination with any of the previous embodiments, initiating, via the first testing tool application, the testing of the technology resource application, further comprises: parsing a first test step of the one or more test steps associated with the first application test script; determining a first test object of the one or more test objects referenced by the first test step; retrieving, from a first memory location, a first test data artifact of the one or more test data artifacts associated with the first test object; testing the technology resource application by providing the first data artifact as an input to a first functional feature of the technology resource application based on selecting the first test object node in the object repository code using the query pointer path; and in response to testing the technology resource application, determining a first test output provided by the technology resource application.

In some embodiments, or in combination with any of the previous embodiments, initiating, via the first testing tool application, the testing of the technology resource application further comprises generating a testing report for the technology resource application based on the first test output.

In some embodiments, or in combination with any of the previous embodiments, executing the computer readable instructions further cause the at least one processor to: determine a plurality of test cases for testing the technology resource application, wherein the plurality of test cases are associated with the first application test script; executing, automatically, via an execution medium, the plurality of test cases for testing the technology resource application, in parallel; and generating a testing report based on the execution of the plurality of test cases.

In some embodiments, or in combination with any of the previous embodiments, wherein the first testing tool application is associated with a first technical platform, wherein the first application test script comprising the one or more test steps is associated with the first technical platform, wherein executing the computer readable instructions further cause the at least one processor to: receive an indication to initiate testing of the technology resource application using a second testing tool application, wherein the second testing tool application is associated with a second technical platform; construct a second application test script associated with the second testing tool application, wherein constructing the second application test script comprises transforming the one or more test steps of the first application test script into a format associated with the second technical platform; and initiate, via the second testing tool application, testing of the technology resource application using the second application test script, the test object repository and the associated test data artifacts.

In some embodiments, or in combination with any of the previous embodiments, the object repository code is encoded in an Extensible Markup Language (XML) format in the test object file.

In some embodiments, or in combination with any of the previous embodiments, creating one or more test objects associated with a technology resource application, further comprises: receiving an indication to create a first test object of the one or more test objects for testing a first functional feature of the technology resource application; determining a first unique identifier for the first test object; determining one or more object parameters for the first test object; constructing a first query pointer path associated with the first test object based at least on the first unique identifier; and constructing the test object repository comprising the first test object, wherein constructing the test object repository comprises constructing the object repository code with a first node associated with the first test object based on the one or more object parameters of the first test object and the first query pointer path.

In some embodiments, or in combination with any of the previous embodiments, wherein the adaptive application testing module further comprises instructions that cause the at least one processor to: receive an indication to create a second test object of the one or more test objects for testing a first functional feature of the technology resource application, wherein the second object is associated with a child class of the first test object; determine a second unique identifier for the second test object; determine one or more object parameters for the second test object comprising a child class parameter of one or more object parameters; construct a second query pointer path associated with the second test object based at least on the second unique identifier; and modify the test object repository to comprise the first test object and the second test object, wherein modifying the test object repository comprises augmenting the object repository code with a second node associated with the second test object such that the second node is child of the first node.

In some embodiments, or in combination with any of the previous embodiments, the one or more object parameters comprise a class parameter and an object type parameter.

In some embodiments, or in combination with any of the previous embodiments, the object type parameter comprises a web edit object type, a web button object type, a web list object type, a web area object type, a checkbox object type, a radio group object type, and a web table object type.

In some embodiments, or in combination with any of the previous embodiments, the one or more object parameters are associated with location properties of the first functional feature of the technology resource application associated with the first test object, wherein the one or more object parameters comprise a cascading sheet style (CSS) parameter, an element tag name parameter, a link text parameter, a partial link text parameter, and a class name parameter.

In some embodiments, or in combination with any of the previous embodiments, the one or more object parameters are associated with user interface properties of the first functional feature of the technology resource application associated with the first test object, wherein the one or more object parameters comprise a key parameter, a default value parameter, a category parameter, and an information parameter.

In some embodiments, or in combination with any of the previous embodiments, the adaptive application testing module further comprises instructions that cause the at least one processor to: initiate, via a display device of a user device, a presentation of a test asset manager interface on the user device; receive, via the test asset manager interface, the one or more test objects associated with the technology resource application from a user, wherein receiving the one or more test objects further comprises receiving one or more object parameters for the one or more test objects; display, via the test asset manager interface, the query pointer path for each of the one or more test objects; and display, via the test asset manager interface, the test object repository comprising the one or more test objects.

In some embodiments, or in combination with any of the previous embodiments, the adaptive application testing module further comprises instructions that cause the at least one processor to: receive, via the test asset manager interface, an indication to add a new test object to the test object repository from the user; and modify the test object repository to comprise the one or more test objects and the new test object, wherein modifying the test object repository comprises modifying the object repository code in the test object file.

In some embodiments, or in combination with any of the previous embodiments, the test asset manager interface is configured to allow the user to search the test object repository for a first object of the one or more objects.

In some embodiments, or in combination with any of the previous embodiments, the adaptive application testing module further comprises instructions that cause the at least one processor to: receive, via the test asset manager interface, an indication to modify a first test object of the one or more test objects from the user; and modify the test object repository based on the indication from the user, wherein modifying the test object repository comprises modifying the object repository code in the test object file.

In some embodiments, or in combination with any of the previous embodiments, the adaptive application testing module further comprises instructions that cause the at least one processor to: log, in real time, one or more actions performed by the user via the test asset manager interface; and display, via the test asset manager interface, the logged one or more actions.

BRIEF DESCRIPTION OF THE DRAWINGS

Figure 1:
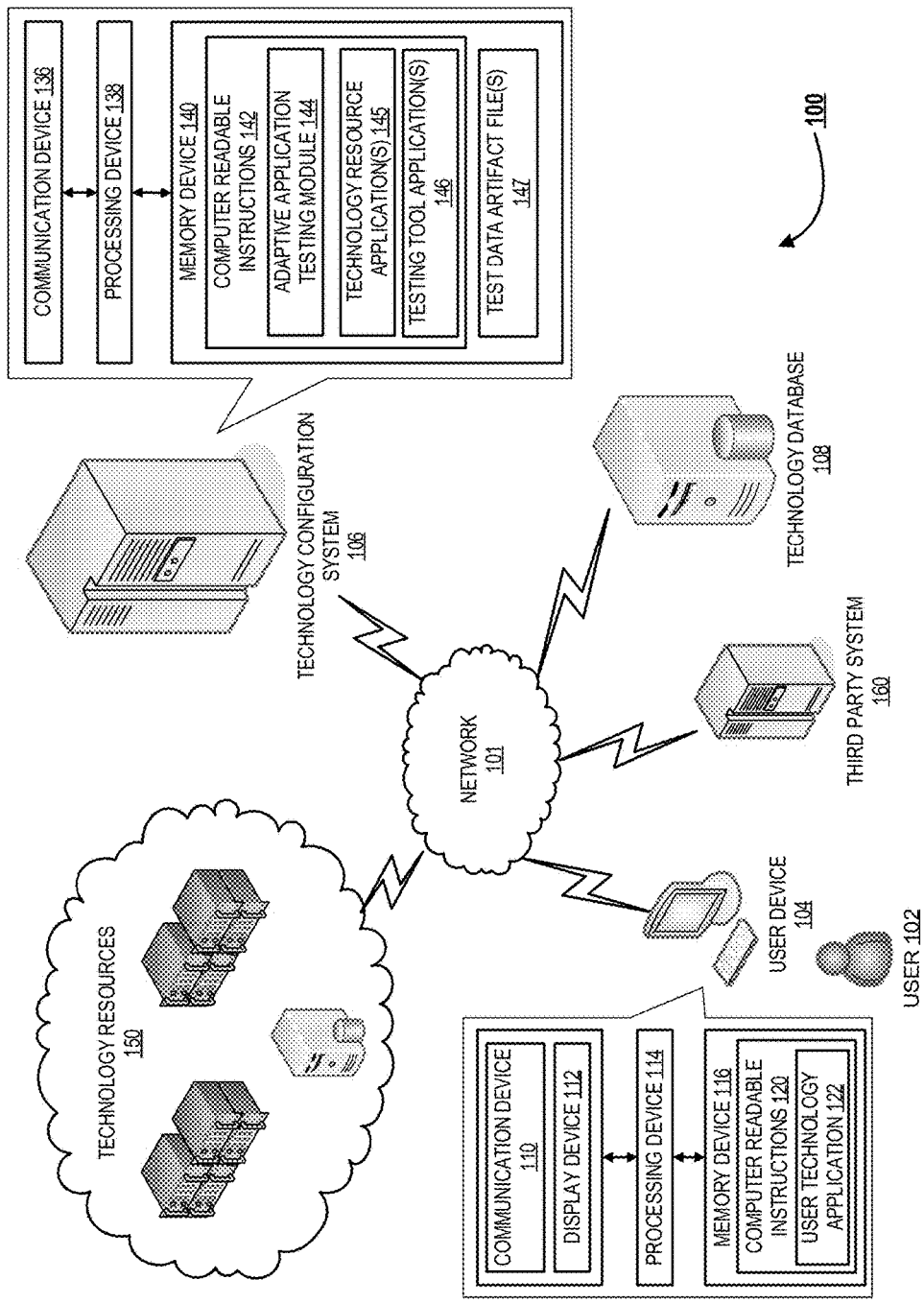
Figure 2A:
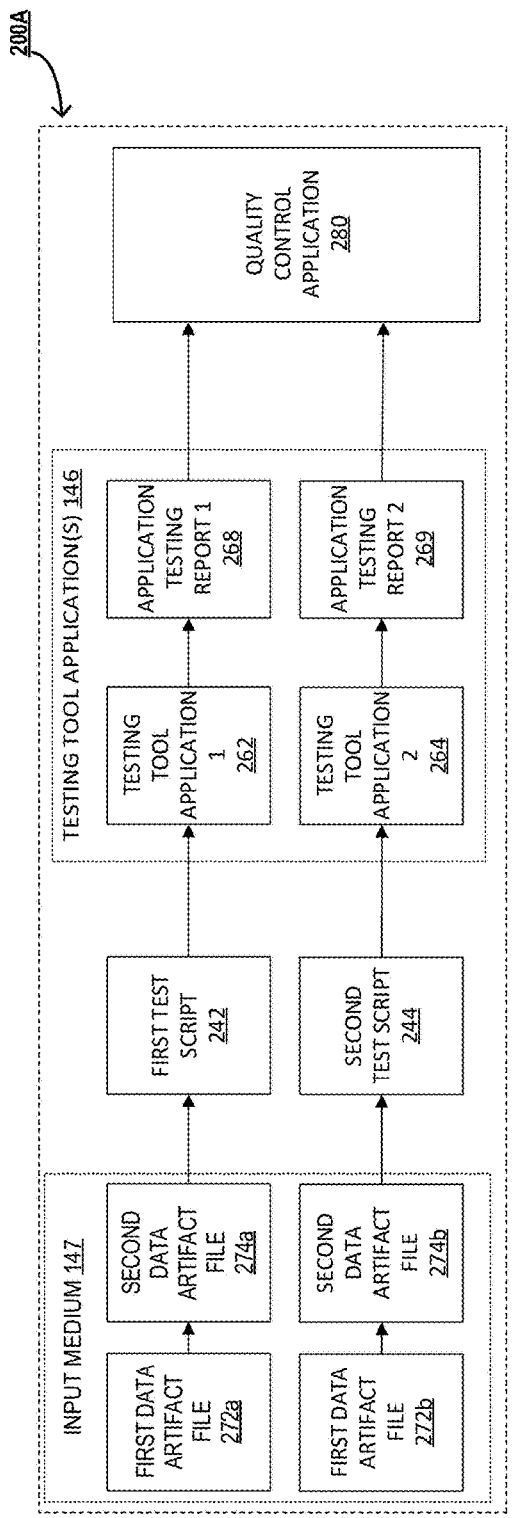
Figure 2B:
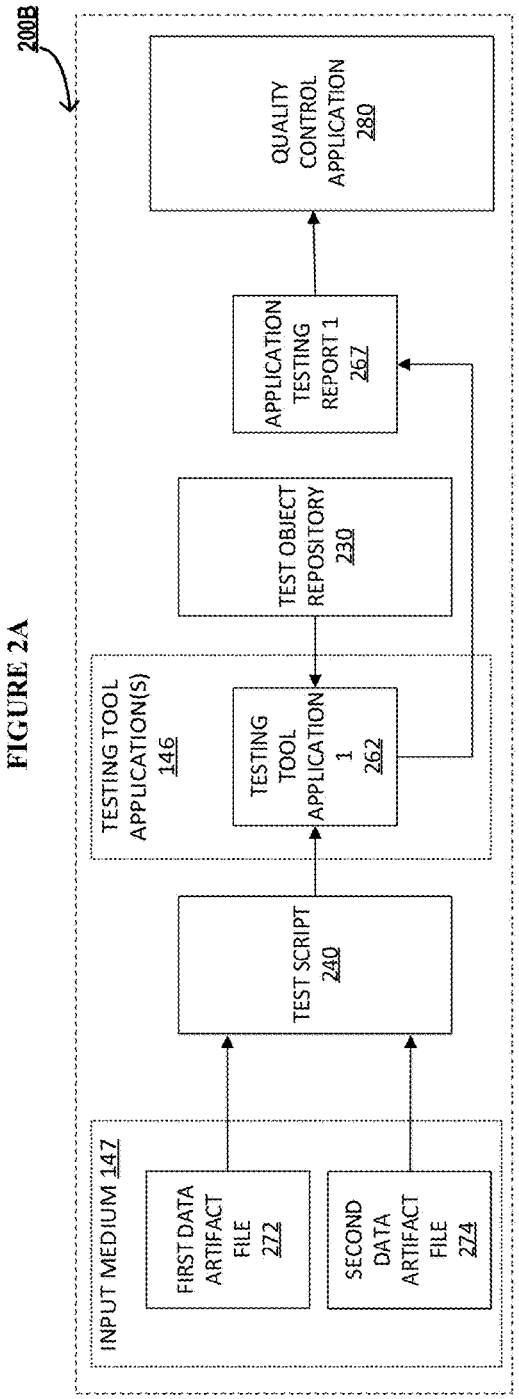
Figure 3:
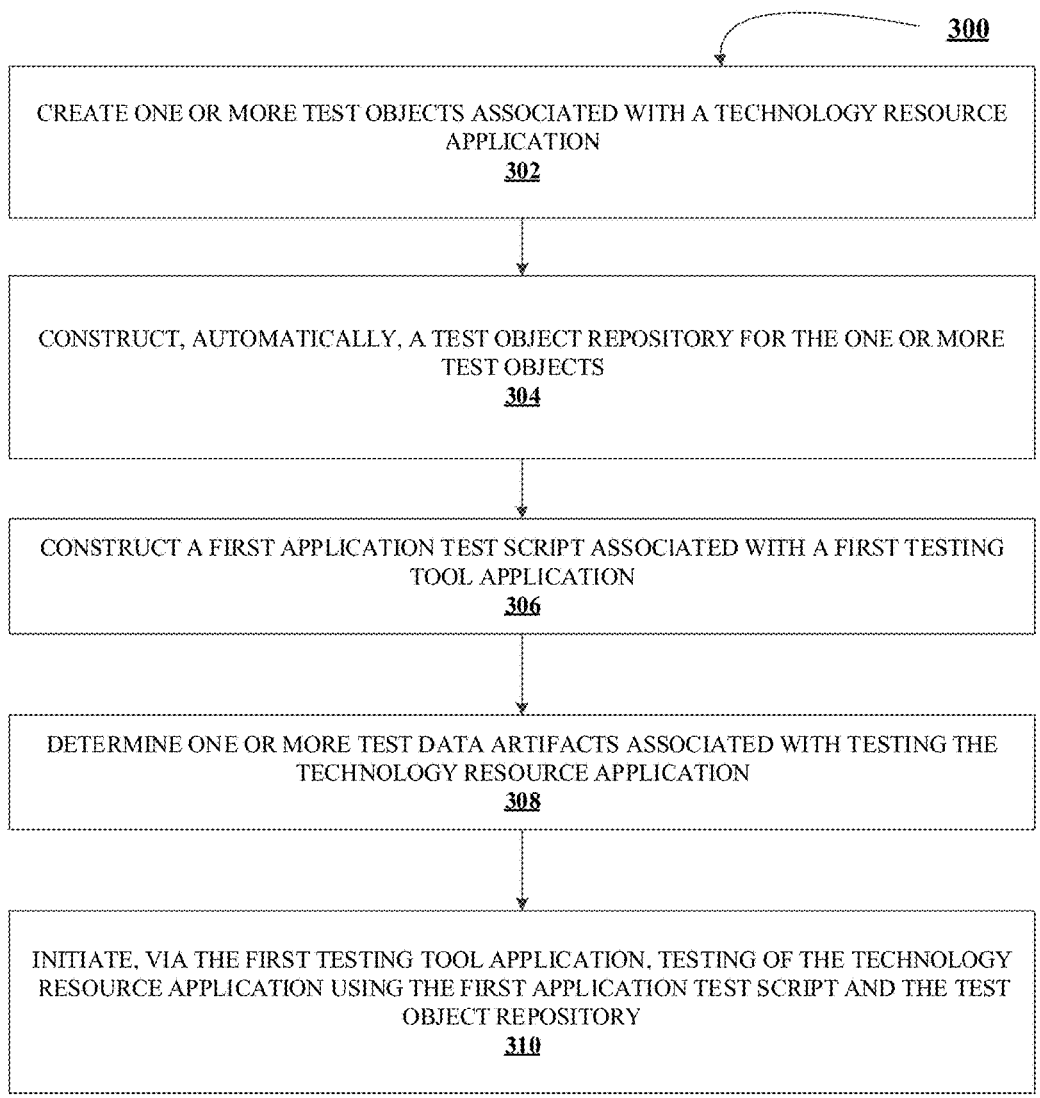
Figure 4:
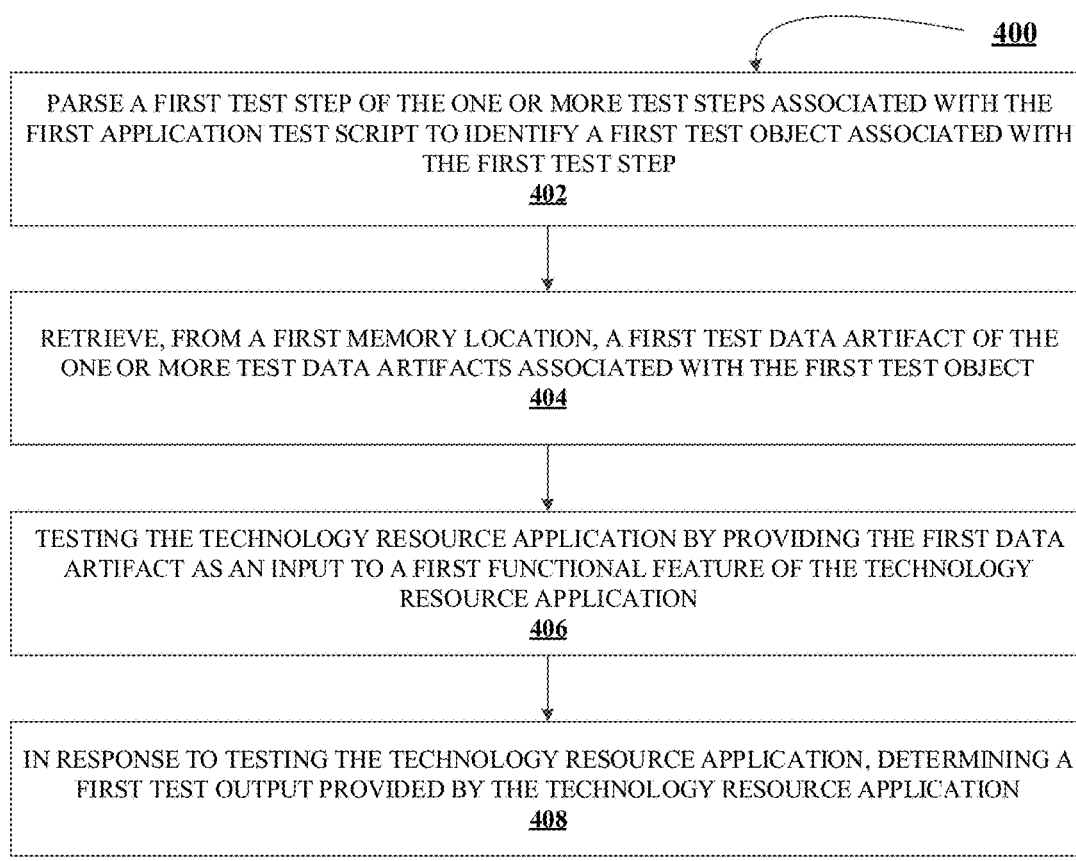
Figure 5:
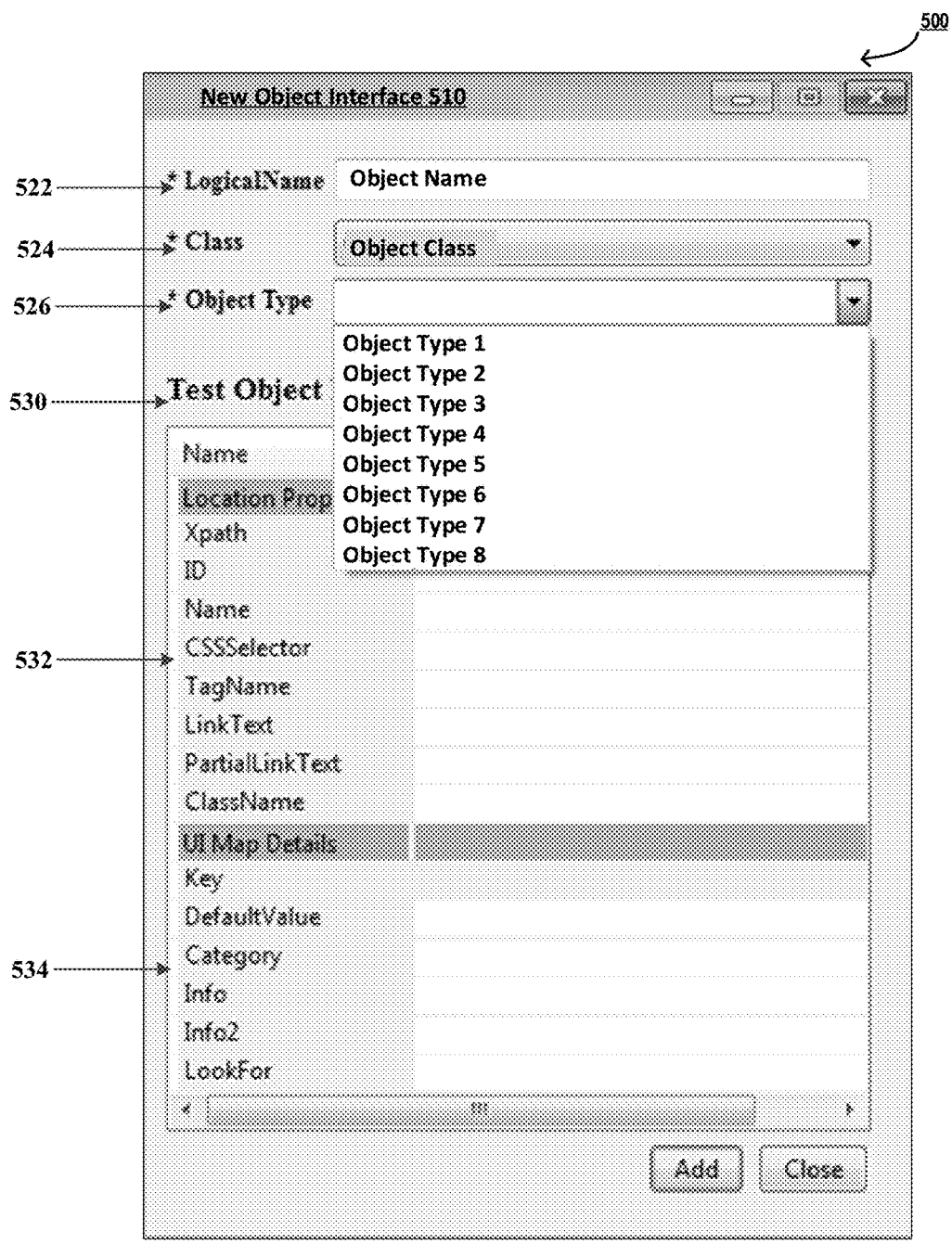
Figure 6:
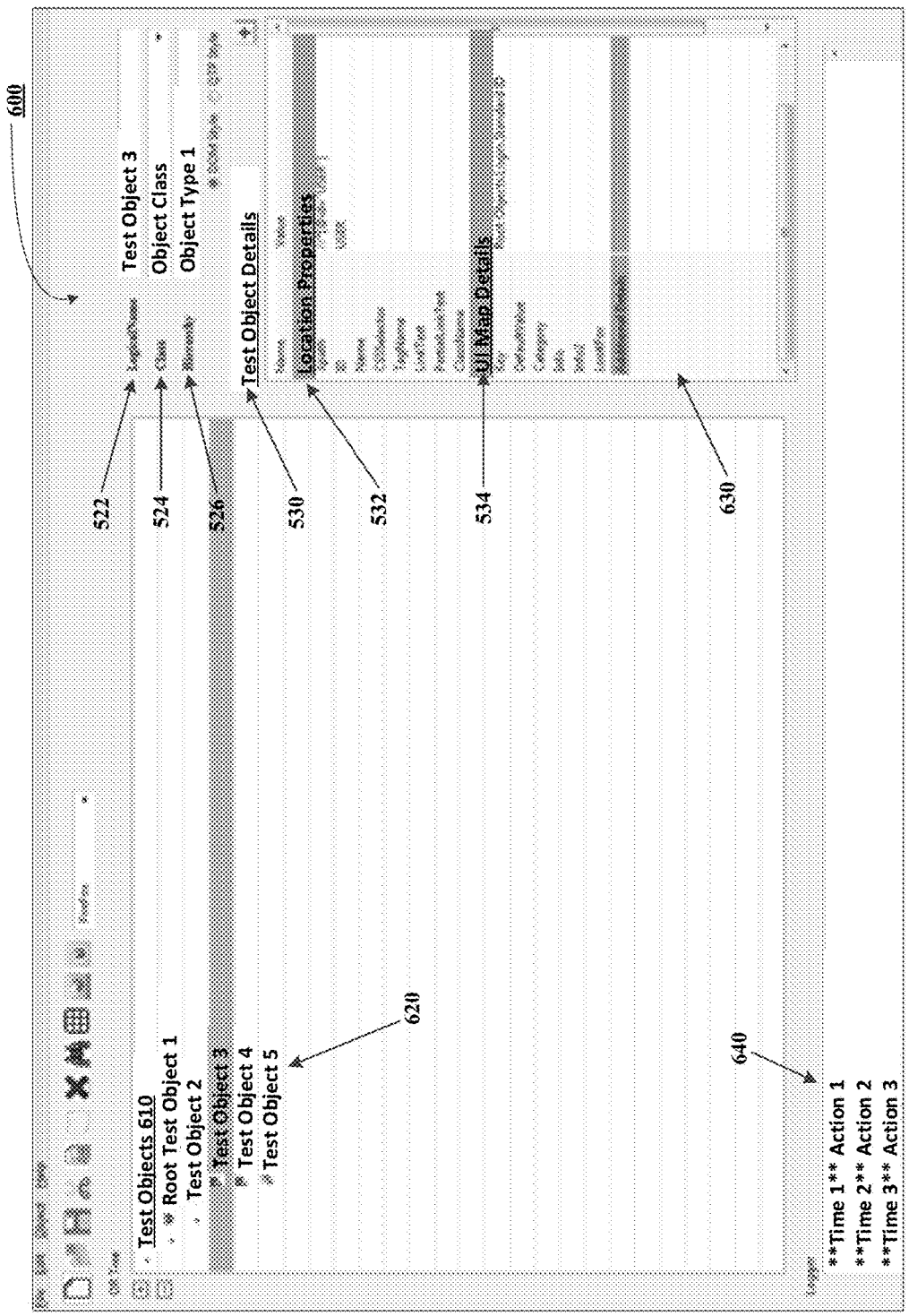

Having thus described embodiments of the invention in general terms, reference will be made to the accompanying drawings, where:

FIG. 1 illustrates a block diagram a technology resource evaluation system environment 100, in accordance with one embodiment of the invention;

FIG. 2A illustrates a high level process flow 200A for a conventional testing scenario;

FIG. 2B illustrates a high level process flow 200B for testing of a technology resource application, in accordance with one embodiment of the invention;

FIG. 3 illustrates a high level process flow 300 for testing a technology resource application, in accordance with one embodiment of the invention;

FIG. 4 illustrates a high level process flow 400 for testing a technology resource application, in accordance with one embodiment of the invention;

FIG. 5 illustrates a test asset manager interface 500, in accordance with one embodiment of the invention; and FIG. 6 illustrates a test asset manager interface 600, in accordance with one embodiment of the invention.

DETAILED DESCRIPTION OF THE INVENTION

Embodiments of the present invention may now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, a "user" may be an individual associated with an enterprise or entity. In some embodiments, a "user" may be an employee (e.g., an associate, a project manager, an IT specialist, a manager, an administrator, an internal operations analyst, or the like) of the entity or enterprises affiliated with the entity, capable of operating the system described herein. In some embodiments, a "user" may be any individual or entity who has a relationship with the enterprise. For purposes of this invention, the terms "user" and "customer" may be used interchangeably. In some embodiments, a "user" may be a customer of the enterprise. In one aspect, a user may be a system performing one or more tasks described herein.

In some embodiments, an "entity" or "enterprise" as used herein may be any institution employing information technology resources. In some embodiments the enterprise may be any institution, group, association, business, financial institution, club, establishment, company, union, authority or the like, employing information technology resources.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. In some embodiments, the graphical user interface may include both graphical elements and text elements. In some embodiments, the user interface is presented on display devices of one or more user devices.

Typically, an entity or enterprise is associated with one or more "technology resource applications" for performing a plurality of information technology operational activities of the entity. In some instances, the technology resource applications are a part of the entity system (and/or external systems) comprising encoded information or computer instructions for performing the associated technology operational activities. In some embodiments, the technology resource applications may comprise application software (such as, application suites, enterprise software, enterprise infrastructure software, information worker software, business applications, simulation software, product engineering software, media development software, enterprise infrastructure software, and the like), system software, operating systems (such as, supervisory programs, boot loader programs, shells and the like), device driver programs, utilities/maintenance programs, and/or the like. As such, in some instances, the technology resource applications may be applications or software associated with and/or operating on technology resources of the entity, such as system hardware, operating systems, servers, user interfaces, user/customer device applications/widgets, internal networks, storage/databases, authentication operations, middleware, other software program products, external networks, hosting/facilities, business/technology processes, and other technology resources or technology assets associated with the entity. In some instances, the one or more technology resource applications comprise desktop applications, mobile device applications, web pages, JavaScript, server software (such as web applications using PHP, Java, ASP.NET, and the like), plugins, embedded software, firmware, microcode, graphical user interface software, and/or the like. In some embodiments, the technology resource applications comprise one or more user interface applications that provide one or more user interfaces on user devices such as, web browsers on a computer device, applications/widgets on a mobile device, and the like.

Typically, these one or more technology resource applications are tested before implementation, during operation, periodically during operation lifetime, before or after technology upgrades or modifications to the technology resource applications, for quality testing, for performance testing, for output verification, and/or for error detection/correction and debugging. "Testing" of technology resource applications, as used herein, typically involves execution of the technology resource applications (for example, a software component of the application, a system component of the application, and/or the like) or certain functional features of the technology resource applications (for example, operational elements of a technology application, such as an authentication feature, a cascading sheet navigation feature, a processing feature, processing time for an operation, and/or the like) to evaluate one or more properties, functionality, output and the like, of the application. In some embodiments, the testing of the technology resource applications is facilitated by a technology configuration system (also referred to as the "system" or as the "system 106"), via an adaptive testing framework, using one or more testing tool applications. For instance, evaluation of the one or more properties may comprise determining that the technology resource application being tested meets the requirements/design parameters, is able to correctly install and run in intended environments/platforms, performs functions desirably and within a predetermined period of time and optimally utilizes available resources, and/or to identify/correct bugs or errors. As such, testing of a technology resource application, as used herein, may refer to testing at least a portion of the application, i.e., a functional feature or operational element of the application (for example, testing a user interface/display functionality of a financial application, testing correctness of the outputs, testing authentication/authorization features, testing control flows of the application, testing display/user interface features of the application) using one or more testing tools, for example, after the completion and/or implementation of the technology resource application (for example, after the availability of a testable technology program, after definition of testing processes/parameters, or using at least a partially completed executable software of the technology resource application), concurrently with the programming and testing definition processes of the technology resource application (for example, testing using agile methods), and/or during other phases. As such, the automated testing platform or system described herein is configured for static and/or dynamic testing using one or more associated testing tool applications. Furthermore, the automated testing platform/system described herein is configured for installation testing, compatibility testing, smoke and sanity testing, regression testing, acceptance testing, alpha testing, beta testing, continuous testing, security testing, ability of software to be internationalized and localized, development testing, AB testing and/or the like, using one or more associated testing tool applications.

Moreover, in some embodiments, testing of technology platform applications involves white-box testing to test the internal structures or source code of the technology platform applications, by testing paths within a unit, paths between units during integration testing and/or paths between subsystems during system levels of software testing. In some instances, testing using white-box testing methods involves application programming interface (API) testing, code coverage testing (for example, by constructing test scripts/plans to ensure that all code statements of a certain portion of the technology resource application are executed at least once, function coverage, statement coverage decision coverage, and the like), fault injection methods, mutation testing, static testing, and the like. In some embodiments, testing of technology platform applications involves black-box testing to test the functionality of the technology platform applications and/or non-functional requirements (for example, reliability, scalability, and the like), for unit, integration and/or system levels of software testing. In some instances, black-box testing is performed without accessing or without knowledge of the internal structures and source code of the technology resource applications. In some instances, black-box testing involves equivalence partitioning, boundary value analysis, all-pairs testing, state transition tables, decision table testing, fuzz testing, model-based testing, use case testing, exploratory testing and specification-based testing. In some embodiments, testing of technology platform applications involves gray-box testing, using a combination of white-box and black-box testing, to test the technology platform applications for defects due to improper structure and/or improper use of applications, using the knowledge of at least a portion of the internal structure/source code. In some instances, gray-box testing involves matrix, regression, pattern testing, orthogonal array testing, testing for object-oriented software, and the like.

Testing tool applications, as used herein, typically are software tools, programs, or applications that are configured to test one or more functional features of the technology resource application. In some instances, the testing tool applications are configured to execute application test scripts or test scripts to perform the testing of the technology resource applications. In some instances, testing tool applications may be configured to test predetermined features of the application, predetermined functions of the application, and/or predetermined types of applications. For example, the testing tool applications may comprise graphical user interface testing tools, load testing tools, security testing tools, and the like. The testing tool applications may perform inspection, invoking, development, simulation and mocking, functional testing, load and compliance testing and other operations. Typically, each testing tool application is associated with, or functions within a predetermined technical platform (i.e., technical environment/framework, development environment, and/or technical programming language), such as visual basic, .NET, ActiveX, Cocoa, Java, and the like. Specifically, each testing tool application may be configured to write tests or test scripts, and/or read tests or test scripts only in a predetermined technical programming language such as, C, Java, VBScript, Jscript, PerlScript, Python, PHP, Haskell, Delphi, JavaScript, XML, Ruby, Scala, and the like. The testing tool application, typically, is not able to execute/read scripts in technical languages that are not associated with its predetermined functionality or technical platform. Non limiting examples, of testing tool applications include, Unified Functional Testing (UFT)/HP QuickTest Professional (QTP), Parasoft, Visual Studio Coded UI, SoapUI, and the like. In some instances, a "test script" is a set of instructions, associates with a certain technical platform or written in a certain technical programming language, that are configured to test a functional feature of a technology resource application. In some instances, the test script comprises one or more test steps for testing of the technology resource application. The test scripts are typically executed, at least in part, by the testing tool application, and the execution causes the testing tool application and/or the technology resource application under test to perform one or more operations/steps, to test at least a functional feature of the technology resource application. In some instances, the test script is associated with a "test case" having a set of conditions under which the technology resource application is tested. Typically, testing of the technology resource application involves a plurality of test cases, for example, a positive test case and a negative test case to test an authentication functional feature of a technology resource application.

In some embodiments, testing of the technology resource application comprises one or more steps. A non-limiting example of the steps involved in testing a technology resource application facilitated by the adaptive application testing framework/module and/or the technology configuration system, using one or more testing tool applications is described below. Initially, the system (for example, via the adaptive application testing module, or another external system) may perform a requirements analysis the aspects (functions/features/portions) of the application to be tested and the operating parameters of the aspects, for example, by receiving at least a portion of the testing aspects/parameters from the user. Next, the system is configured to facilitate test planning, comprising determining a test strategy, test plan, testbed creation, and the like. Next, the system typically facilitates test development, by enabling configuration of test procedures, test scenarios, test cases, test datasets and test scripts for testing the technology resource application. Subsequently, the system typically facilitates the execution of the tests on the technology resource application using the testing tool applications, based at least on the test cases and test scripts. Furthermore, in some instances, the system is configured to provide test result analysis, test reporting, defect retesting, and regression testing, based on the executed tests.

As discussed previously, test scripts are complex technical instructions coded in a technical programming language, that are required to be read and executed for the testing of the technology resource application. The conventional test scripts often encompass the instructions for the testing tool application; test steps to be performed; operational parameters, definitions, interdependencies, rules, and other constructs of the functional features of the technology resource application, steps to be performed by the technology resource application for the testing; data input required for testing; and/or other features, coded into the logical structure of the test script. Encoding, modifying or even comprehending the test scripts typically requires a user with technical expertise in the technical programming language of the test script. However, entities often employ multiple testing tool applications to test a particular technology resource application. Specifically, entities may be required to migrate from one testing tool application associated with a first technical platform to another testing tool application associated with a second technical platform, for example, due to improvements in technology, updates to the testing tools, changing requirements, modifications in the technology resource application, and the like. For such a migration from one testing tool application to another, the test script associated with the first technical platform is required to be encoded, again, in the second technical platform to ensure compatibility with the new testing tool application, which would otherwise fail to execute the script. This reformulation of the test script requires the user to have technical expertise with the platforms, and is labor intensive, time consuming, involves high costs and requires processing and memory resources. Furthermore, in the instances where the technology resource application features are modified, for example, during the building phases of the application or later on in lieu of changing requirements, the test script has to be rewritten, at least in part, by a user with technical expertise, and again inevitably consuming time, processing, and financial resources. Therefore, conventional test scripts are not easily portable across various platforms of testing tool applications, and cannot be encoded without relevant technical expertise and skill. Moreover, certain testing tool applications, (for example, certain open source testing tool applications) do not permit or are not configured for utilizing objects or object definitions that are not embedded in or are associated with the test script.

The novel adaptive application testing framework of the present invention addresses the above factors and also provides other advantages described throughout this disclosure. In particular, the present invention is adaptive, in that, it enhances the portability of the test scripts across various testing tools during migration between tools. Specifically, the present invention constructs a test object repository with one or more test objects that are associated with operational parameters, definitions, interdependencies, rules, and other constructs of the functional features of the technology resource application. This test object repository is then referenced by the test script during execution of the testing operations, with the test script having test steps of vastly reduced complexity and reduced number. Therefore, during migration, due to the novel configuration of the test object repository and the fact that the complex logical structures of the functional features external to the script, only minimal modifications, such as syntax or syntax term conversions, to the test script facilitate compatibility with the new tool, which may be performed with minimal understanding of the platform. The modified test script would also reference the existing test object repository during the testing, thereby precluding the need to re-encode the entire complex structure. Accordingly, the present invention provides ease of migration and portability of the test scripts, with reduced consumption of resources. For an illustrative example of a user interface (UI) technology resource application under test, having about 5 pages and about 20 UI objects or functional features in each page, the present invention facilitates migration between testing tool applications by about 18 hours quicker than conventional methods, and by about a cumulative 1200 hours less for testing during a time period of a year, and consequently, further reducing the cost and resources consumed, as well. Moreover, the test object repository facilitates ease of modification and updating of the properties, definitions and hierarchy of the test objects. For instance, the system is configured to automatically inspect functional features of the technology resource application, identify changes, and automatically modify corresponding test objects in the repository to reflect the current and real-time functional features for testing, without having to manually modify the test script at all.

Furthermore, the test object repository allows construction of the objects, for example without properties/parameters, even before the technology resource application. Moreover, the present invention enables fundamental transformation of a the complex internal structure of the test object repository comprising, hierarchy, UI maps, parameters and properties of test objects into a mere flat file or unstructured file, which can be easily read in a variety of technical platforms by the testing tool applications, thereby facilitating portability of the complex test objects across various platforms.

In addition, the adaptive application testing framework of the present invention provides a test asset manager interface on a user device, that enables a user to construct, modify, search and manage in an integrated manner, the one or more objects and the test object repository, easily, without requiring technical expertise of the user. Furthermore, the test asset manager interface facilitates construction of the objects, untethered from the test script, even before the technology resource application is available for testing. For instance, the system facilitates creation of objects without specification of all properties or parameters. In addition, the test asset manager interface facilitates search and identification of test objects without requiring time consuming sequential/manual searching. Furthermore, the test asset manager interface and the adaptive application testing module/framework facilitates addition and/or creation of tandem-UI map specific details without requiring individual creation.

Moreover, adaptive application testing framework facilitates, creation, management and utilization of test objects using the test asset manager interface, external to the test script and/or the test data artifacts, for testing the technology resource application, even in the instances where testing tool applications that are not configured for utilizing external or non-embedded objects are employed to test the technology resource application. Therefore, the adaptive application testing framework causes testing tool applications that would not otherwise be configured to test a technology resource application using test objects external to the test script, to reference, employ and interface external test objects. The embodiments, features, functions, and advantages of the present invention are described in detail below.

FIG. 1 illustrates a technology resource evaluation or testing system environment 100, in accordance with one embodiment of the present invention. As illustrated in FIG. 1, the technology configuration system 106 is operatively coupled, via a network 101 to technology resources 150, the technology database 108, the user system/device 104, and to the third party system 160. The system environment 100 is described in detail, below.

The technology configuration system environment 100, and specifically the system 106, in accordance with one embodiment of the present invention, configured for testing a technology resource application. Specifically, the technology configuration system environment 100 is configured for providing an adaptive application testing framework configured for testing of the technology resource application using multiple testing tool applications by facilitating portability of test objects associated with the technology resource application across the multiple testing tool applications. Furthermore, the technology configuration system environment 100 is configured for providing a test asset manager interface on a user device.

As illustrated in FIG. 1, the technology configuration system 106 is operatively coupled, via a network 101 to technology resources 150, the technology database 108, the user system/device 104, and to the third party system 160. In this way, the technology configuration system 106 can send information to, and receive information from the technology resources 150, the technology database 108, the user system 104 and the third party system 160 for testing the technology resource applications. FIG. 1 illustrates only one example of an embodiment of the technology configuration system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), near field communication network, audio/radio communication network, ultra-high frequency wireless communication network, or any other type of network or combination of networks. The network 101 may provide for wireline, wireless, or a combination wireline and wireless communication between devices on the network 101.

In some embodiments, the user 102 is an individual associated with the entity. In some embodiments, the user 102 may access the technology configuration system 106 through an interface, such as the test asset manager interface, comprising a webpage or a user technology resource application 122. The system 106, and the adaptive application testing module 144 in particular, is configured to preset the test asset manager interface on a display device 112 of the user device, via the user technology application 122. Hereinafter, "user technology resource application" is used to refer to an application on the user system 104 of a user, a widget, a webpage accessed through a browser, and the like. In some embodiments the user technology resource application 122 is a user system application stored on the user system 104. In some embodiments the user technology resource application may refer to a third party application or a user application stored on a cloud used to access the technology configuration system through a network. In some embodiments, at least a portion of the user technology resource application 122 is stored on the memory device 140 of the technology configuration system 106. The user 102 may subsequently navigate through the interface, retrieve one or more activity records, provide confirmation, or review presented information using a user system 104.

FIG. 1 also illustrates the user system 104. The user system 104 generally comprises a communication device 110, the display device 112, a processing device 114, and a memory device 116. The user system 104 is a computing system that allows a user 102 to interact with the technology configuration system 106 to configure, monitor or control technology resource application testing activities. The processing device 114 is operatively coupled to the communication device 110, the display device 112, and the memory device 116. The processing device 114 uses the communication device 110 to communicate with the network 101 and other devices on the network 101, such as, but not limited to the third party system 160 and the technology configuration system 106. As such, the communication device 110 generally comprises a modem, server, or other device for communicating with other systems/devices on the network 101. In some embodiments the network 101 comprises a network of distributed servers.

The user system 104 comprises computer-readable instructions 120 stored in the memory device 116/data storage, which in one embodiment includes the computer-readable instructions 120 of the user technology resource application 122. In this way, a user 102 may remotely communicate with the technology configuration system 106, view retrieved data and visual displays, and/or modify the implementation of application testing activities using the user system 104, via the test asset manager interface. The user system 104 may be, for example, a desktop personal computer, a mobile system, such as a cellular phone, smart phone, personal data assistant (PDA), laptop, or the like. Although only a single user system 104 is depicted in FIG. 1, the system environment 100 may contain numerous user systems 104.

As further illustrated in FIG. 1, the technology configuration system 106 generally comprises a communication device 136, a processing device 138, and a memory device 140. As used herein, the term "processing device" (also referred to as "at least one processor") generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs or one or more modules, based on computer-readable instructions thereof, which may be stored in a memory device, for example, the memory device 140, the database 108, the memory device 116, and the like.

The processing device 138 is operatively coupled to the communication device 136 and the memory device 140. The processing device 138 uses the communication device 136 to communicate with the network 101 and other devices on the network 101, such as, but not limited to the technology database 108, the third party system 160 and the user system 104. As such, the communication device 136 generally comprises a modem, server, or other device for communicating with other devices on the network 101.

As further illustrated in FIG. 1, the technology configuration system 106 comprises computer-readable instructions 142 stored in the memory device 140, which in one embodiment includes the computer-readable instructions 142 of an adaptive application testing module 144 configured for testing of the technology resource application using multiple testing tool applications by facilitating portability of test objects associated with the technology resource application across the multiple testing tool applications. In some embodiments, the memory device 140 comprises a non-transitory computer readable storage medium comprising computer readable/executable instructions, that when executed by the processing device 140 cause the processing device to perform one or more steps described herein. The technology configuration system 106 may further comprise computer-readable instructions 142 for one or more technology resource applications 145 that are desired to be tested. In some embodiments, the technology configuration system 106 may further comprise computer-readable instructions 142 for one or more testing tool applications 146 configured for testing at least a portion of the one or more technology resource applications 145. In some embodiments, the technology configuration system 106 may further comprise test data artifact file(s) 147 or input medium 147 for testing the technology resource applications 145, stored in the memory device 140. In some embodiments, the memory device 140 includes data storage (not illustrated) for storing data related to the technology resource application testing activities, but not limited to data created and/or used by the modules 144 to 146. Although illustrated as being stored in the technology configuration system 106, in some embodiments, one or more of the modules 144 to 146 and the test data artifact file(s) 147, may be stored external to the system 106 (such as the third party system 160, the technology database 108, the technology resource systems 150, and the like), from where the system 106 may access, execute and or cause the modules to perform one or more functions.

As further illustrated by FIG. 1, the system environment 100 further comprises a technology database 108. In some embodiments, the technology database 108 may be directed to a memory storage technology resource, a memory location or data storage comprising a plurality of test data artifact files 147. The system environment 100 further comprises technology resources 150 comprising system hardware and servers associated with an execution medium (such as a local farm) for distributed processing of application testing activities and distributed execution of test cases. In some embodiments, the technology configuration system 106 communicates with the individual technology resources 150, via established operative communication channels. In this regard, the system 106 may transmit control instructions that cause the technology resources 150 to perform one or more actions, provide activity data, and the like. The technology resources 150 are typically configured to communicate with one another, other devices operated by the entity, and devices operated by third parties (e.g., customers), such as a third party computing device 160, via a network 101.

FIG. 2A illustrates a high level process flow 200A illustrating a conventional testing scenario. As discussed previously, testing of a technology resource application comprises executing a test script using a testing tool application. The conventional test scripts are complex technical instructions coded in a technical programming language, that are required to be read and executed for the testing of the technology resource application. The conventional test scripts often encompass the instructions for the testing tool application; test steps to be performed; operational parameters, definitions, interdependencies, rules, and other constructs of the functional features of the technology resource application, steps to be performed by the technology resource application for the testing; data input required for testing; and/or other features, coded into the logical structure of the test script. Furthermore, during execution of a test script by a testing tool application to test a functional feature of a technology resource application, the testing tool application executes the one or more test steps of the test script.

In some instances, the test step comprises instructions regarding the input parameters or data artifacts to be provided for the testing of the functional feature. The input parameters or data artifacts are typically provided as input to the functional feature being tested, and the technology resource application, and the functional feature being tested in particular, is run/executed. The response, output or subsequent steps performed by the technology resource application is analyzed, in conjunction with the input parameters or data artifact provided, to determine, whether is functional feature is functioning the way its intended, whether the functional feature has any bugs and/or whether the feature has any errors. The plurality of input parameters or data artifacts are typically utilized for the testing of a functional feature (for example, a first number of a first type of data artifact are used to conduct repetitive testing of a functional feature for a first number of test cases or test cycles, and/or a first type of data artifact and a second type of data artifact are utilized), and these parameters are collectively referred to as an input medium 147 or test data artifact files 147.

As discussed previously, the input medium 147 or test data artifact files 147, or predetermined portions of the input medium 147 or test data artifact files 147 may be stored at suitable memory locations. FIG. 2A illustrates an input medium 147 or test data artifact files 147 comprising a first data artifact file(s) (272a, 272b) having one or more data artifacts of a first type and a second data artefact file(s) (274a, 274b) having one or more data artifacts of a second type. For example, the first data artefact file(s) (272a, 272b) may be feature files (".feature") or a collection of feature files, having data artifacts of a first type (for example, test scenarios, test features, test steps, step definitions, parameters, and the like). As another example, the second data artifact file(s) (274a, 274b) may comprise an organized data file (such as a spreadsheet) comprising data artifacts of a second type such as alphanumeric values, formulae, and the like. As another example, the second data artifact file(s) (274a, 274b) may comprise a combination of feature files and organized data files. In some embodiments, the test data artefact files (272a, 272b, 274a, 274b) comprise test steps, object definitions and other descriptive language. Here, in some instances, each test data artifact file is associated with specific technical parameters that are compatible with a predetermined testing tool application. For example, the test data artifact files (272a, 274a) may be associated with a first testing tool application 262.

Typically, as a testing tool application (262, 264) executes an associated test script (242, 244), the testing tool application reads/executes each test step. In accordance with the test script/or particular test step (for example, test script 244) that references/calls an input variable, the testing tool application (for example, the second testing tool application 264) retrieves the requisite data artifact from the data artifact file (for example, 272b, 274b) and provides it as an input to the technology resource application being tested, as instructed by or in accordance with the test script (for example, test script 244) and/or the data artifact (for example, 272b, 274b). The technology resource application is then run, and a testing report (268, 269) may be generated by the testing tool application (262, 264) based on the results of the testing. These testing reports (268, 269) may then be transmitted to a quality control application 280 for further actions or analysis.

As discussed previously, each testing tool application (262, 264) is associated with, or functions within a predetermined technical platform and is configured to execute or is compatible with a test script in a technical language that is associated with the predetermined technical platform. As discussed previously, for migration from the first testing tool application 262 associated with a first technical platform to the second testing tool application 264 associated with a second technical platform, the first test script 242 associated with the first technical platform is required to be encoded, again, in the second technical platform to ensure compatibility with the second testing tool application 264, which would otherwise fail to execute the script. This reformulation of the first test script 242 into the second test script 244 requires the user to have technical expertise with the platforms, and is labor intensive, time consuming, involves high costs and requires processing and memory resources. Furthermore, in the instances where the technology resource application features are modified, for example, during the building phases of the application or later on in lieu of changing requirements, the test script(s) (242, 244) and the data artifact file(s) may be required to be rewritten, at least in part, by a user with technical expertise, and again inevitably consuming time, processing, and financial resources. Therefore, conventional test scripts (242, 244) are not easily portable across various platforms of testing tool applications (262, 264).

FIG. 2B illustrates a high level process flow 200B illustrating testing of a technology resource application, in accordance with one embodiment of the invention. Some or all of the steps associated with the process flow 200b may be performed by the system 106, either alone or in combination with the technology resources 150, technology database 108, user device 104 and other devices/systems. FIG. 2B illustrates the testing of a technology resource application using a testing tool application 262, via the adaptive application testing framework of the present invention. FIG. 2B further illustrates an input medium 147 comprising first and second data artifact files (272, 274) having first and second types of data artifacts, which are substantially similar to the artifact files ((272a, 272b), (272a, 272b)) respectively.

As discussed previously, the adaptive testing module/framework of the present invention is configured to construct a test object repository 230 with one or more test objects that are associated with operational parameters, definitions, interdependencies, rules, and other constructs of the functional features of the technology resource application. This test object repository 230 is then referenced by the test script 240 during execution of the testing operations, with the test script 240 having test steps of vastly reduced complexity and reduced number, in comparison with that of scripts 242 and 244. The system 106, for example, via the module 144 and/or testing tool application 262 then reads/executes the test script 240, parses the test objects of the test object repository 230 into the test script 240 and retrieves and parses associated test data artifacts (272, 274) into the test script 240, in accordance with the test script. For instance, the testing tool application 262, provides the retrieved data artifact as an input to the technology resource application being tested, and generates an application testing report 267, which is then transmitted to a quality control application 280 for further analysis and debugging.

During migration to another testing tool application (for example, the testing tool application 264), due to the novel configuration of the test object repository 230 and the fact that the complex logical structures of the functional features external to the script in the repository 230, only minimal modifications, such as syntax or syntax term conversions, to the test script 240 are sufficient facilitate compatibility with the new tool (264), which may be performed with minimal understanding of the platform. As such, the present invention enhances the portability of the test scripts across various testing tools during migration between tools. The modified test script 240' (not illustrated) would also reference the existing test object repository 230 during the testing, thereby precluding the need to re-encode the entire complex structure. Accordingly, the present invention provides ease of migration and portability of the test scripts, with reduced consumption of resources.

FIG. 3 illustrates a high level process flow 300 for testing a technology resource application, via the adaptive application testing framework/module 144, in accordance with one embodiment of the invention. As discussed previously, the present invention provides an adaptive application testing framework configured for testing of the technology resource application using multiple testing tool applications by facilitating portability of test objects associated with the technology resource application across the multiple testing tool applications. Some or all of the steps associated with the process flow 300 may be performed by the system 106 (the "system"), either alone or in combination with the technology resources 150, technology database 108, user device 104 and other devices/systems. Typically, the system 106 comprises an adaptive application testing module 144, stored in at least one memory device 140, configured for evaluation, modification and quality control of data associated with information technology operational activities. In some embodiments, the system 106 comprises at least one processor 138 configured to execute computer readable instructions associated with the adaptive application testing module 144, for one or more steps of process flow 300. Executing the instructions in the adaptive application testing module 144 (and/or other modules within the technology configuration system 106) may cause the system 106, hereinafter referred to as "the system" to perform one or more steps described below with respect to process flow 300.

Initially, the system may receive an indication, for example from the user, via a test asset manager interface of a user device, to initiate testing of a technology resource application. In this regard, the user may further specify a functional feature of the technology resource application to be tested, or alternatively, the system may test one or more functional features of the technology resource application, sequentially. As a non-limiting example, the system may test a graphical user interface functional feature of the technology resource application, such as a financial application, a gaming application, a programming application, a server application, and the like. This graphical user interface may be an interface presented in the user device by the technology resource application. At block 302, the system may create or generate one or more test objects associated with a technology resource application. Typically, the system retrieves a functional feature of the technology resource application stored in a suitable memory location, based on analyzing the stored application, based on executing at least a portion of the application, based on receiving an indication from the user, and/or based on receiving an indication from another application. The one or more test objects are elements, data input features, data output features, portions, constructs or mechanisms associated with the technology resource application, and the functional feature being tested in particular. As discussed previously, the functional feature is an operational element of the technology resource application, such as an authentication feature. In this regard, the system is configured to automatically inspect, either on a one-time, intermittent or periodic basis, the technology resource application, to identify the most current functional features and import them. For instance, the system may determine a suitable browser for a technology resource application, execute the technology resource application within the browser, identify the functional features and import/retrieve the features, and/or their properties/parameters to be used for real-time creation of test objects, from the browser.

The system then creates one or more test objects associated with the functional feature of the technology resource application. In some instances, the one or more objects are associated with operational parameters, definitions, interdependencies, rules, and other constructs of the functional features of the technology resource application. Continuing with the previous example, the one or more objects associated with testing of the graphical user interface of a technology resource application may include, widgets, hyperlinks, dialog box elements, widows, menu elements, cascading style sheet elements/objects, display elements/objects, visual indicators, graphical icons, control elements (buttons, scroll bars, check boxes, radio buttons, sliders, spinners, drop-down lists, toolbars, ribbons), navigation elements/objects (links, tabs, scrollbars), input/output elements (text boxes, labels, status bars) and/or the like, or a suitable combination. More specifically, for testing an authentication functional feature of the graphical user interface of the application, the one or more objects may comprise an username object (for example, an input object such as a text box), password object (for example, an input object such as a text box), user challenge-response object (for example, a user/input element such as a combo box, selectable icons, menus, a user output element such as an image, an input element such as a text box, and the like), and/or the like. In some embodiments, the system initiates a presentation of a new object interface 510 (illustrated in FIG. 5) of the test asset manager interface on the user device, to facilitate receiving at least a portion of the one or more objects and/or their properties/parameters from the user.

In some instance, the system receives an indication (for example, from the user via the new object interface 510) to create a first test object of the one or more test objects for testing a first functional feature of the technology resource application. Alternatively, the system may determine or identify, automatically, the objects to be created based on the functional feature being tested. In some instances, the system, receives (or assigns) an object name 522. The system then determines a unique identifier for the object, for example, based on the received object name 522.

Typically, each test object is associated with one or more object parameters that relate to the characteristics, definitions, features and interconnections of the objects. These object parameter may be determined by the system, automatically, (for example, by analyzing and/or executing the technology resource application stored in a memory location, and retrieving the one or more object parameters) and/or they may be provided by the user, at least in part, via the interface 510. In this regard, the system is configured to automatically identify, ascertain and determine the one or more object parameters by inspecting, either on a one-time, intermittent or periodic basis, the technology resource application, to identify the most current object parameters, typically, by executing the technology resource application to ascertain functionality or by parsing the code of the application.

One such object parameter includes an object class parameter 524. Construction of the one or more test objects is described below with respect to the previous example of testing an authentication feature of a graphic user interface of an application, for illustrative purposes. Continuing with the previous example, the object class parameters 524 for a graphical user interface may include a browser class, a page class, a frame class, an UI object class, and the like. The system may construct the one or more test objects for this example, as follows, for example based on receiving input from the user via the interface 510. The authentication features may be presented on a browser of a user device by the technology resource application. Accordingly, the system may construct a first test object with an object name 522 as "Root object" and the object class parameter 524 as a browser class. Furthermore, the technology resource application may present the authentication features on a login page within the browser. Accordingly, the system may construct a second test object for the login page, (typically as a child test object of the first object), with the object name 522 as "Login" and the object class 524 as the page class. This child test object, i.e., the second object is typically created under the first test object, such that the hierarchy and interdependency of the objects is created and defined in the test object repository. Furthermore, a username input graphical element (such as a text box or a drop down menu) and a password input graphical element (such as a text box) may be presented on the login page by the technology resource application, as a part of the authentication functional feature. Accordingly, the system may create a third test object for the username input graphical element (for example, with the object name 522 as "Username" and the object class 524 as the UI object class) and a fourth test object for the password input graphical element (for example, with the object name 522 as "Password" and the object class 524 as the UI object class), as child test objects of the second object. Therefore, the test objects are created in a manner that defines their properties, hierarchy and relationships, for example, as nodes within a logical structure of an object repository code in a test object file. Similarly, the system may create other test objects for other authentication elements presented on the login page, such as user challenge-response objects, confirmation buttons, hyperlink to next page based on successful validation and link to next page based on unsuccessful validation, and the like.

In addition, in some embodiments, the one or more object parameters include an object type parameter 526. The object type parameter may be determined, automatically, by the system, or may be provided by the user, for example, using the interface 510. For the previous example, of the third test object for the username element, the object type parameter may comprise a web edit object type (input text box), a web button object type, a web list object type, a web area object type, a checkbox object type, a radio group object type, a web table object type, and the like.

As discussed, for each test object, the system may determine, receive or assign a unique identifier (test object ID). In some instances, the unique identifier for the test object is the object name. Based on the unique identifier, and/or the one or more object parameters, the system may construct, automatically, a query pointer path for each of the one or more test objects, in some embodiments. The query pointer path (for example, an "XPath") typically facilitates identification, selection, and manipulation of the test object nodes within a logical structure of the object repository code of the test object repository. Continuing with the previous example, the system may create, for instance, a query pointer path for the third test object having "username" as an unique identifier, to be "//*[@id="USERNAME"]".

Furthermore, the one or more object parameters may further comprise secondary object parameters 530, in addition to primary object parameters such as the object class and the object type. These secondary object parameters may include location properties 532 of the test objects that describe the position, function, and configuration and other details of the test objects of the functional feature in the graphical user interface. The one or more secondary object parameters associated with location properties of the first functional feature of the technology resource application associated with the first test object may comprise a cascading sheet style (CSS) parameter, an element tag name parameter, a link text parameter, a partial link text parameter, a class name parameter, and/or the like. Furthermore, secondary object parameters may also include user interface map details/definitions 534, values and the like of the graphical user interface of the functional feature, such as a key parameter, a default value parameter, a category parameter, an information parameter, and or the like.

Moreover, the system may construct, automatically, a test object repository for the one or more test objects created above, at block 304. In some instances, the creation of the test object repository is subsequent to the construction of the test objects at step 302, while in other instances, steps 304 and 302 are concurrent or contemporaneous. In some embodiments, the test object repository is constructed in a test object file. The test object file typically comprises object repository code having the one or more test objects as nodes in its logical structure. In some instances, the logical structure defines the test object parameters, the hierarchy, logical flow and interdependencies of the test objects. The object repository code is encoded such that executing/reading the code would cause the testing tool application to interface the functional feature of the technology resource application being tested, as would be performed, for example, by a user, during regular operations. The one or more test objects may be referenced using the query pointer paths within the object repository codes to facilitate, selection, identification and substitution of data artifact values for the test objects when the object data repository is being parsed by the testing tool application. Typically, the test object repository is configured to be parsed/executed by the adaptive application testing module and a plurality of technology resource applications.

Continuing with the previous example, the test object repository comprising the first, second, third, and fourth test objects may be constructed as object repository code having first, second, third, and fourth nodes associated with the first, second, third and fourth test objects, respectively, based on the one or more object parameters of the test objects and the query pointer paths. Moreover, the object repository code is constructed such that, parsing/executing the code would indicate to or cause an application (such as the testing tool application) that for testing the authentication functional feature, the control would be instructed to flow from the first test object, i.e., the browser (for example, launch a browser) to the second test object, i.e., the login page (for example, select the login page). Furthermore, the code is configured to cause the testing tool application to locate the third test object (username input element) on the login page, locate the fourth test object (password input element) and indicate to the application the relationship between the two. In addition, in some instances, the object repository code may further cause the application testing tool application to retrieve data artifacts associated with username and password values and provide them as an input to the technology resource application to test the authentication feature. As non-limiting example, a portion of the object repository code for the illustrative test objects described above is indicated below:

```
<?xml version="1.0" encoding="UTF-8"?>
- <root>
    - <Browser LogicalName="Root Object" Key="Root Object">
        - <Page LogicalName="Login" Key="Login">
            <WebEdit LogicalName="username" Key="username"
            Xpath="//*[@id="USERNAME"]" ID="USERNAME"/>
            <WebEdit LogicalName="Password" Key="Password"
            Xpath="//*[@id="PASSWORD"]" ID="PASSWORD"/>
        </Page>
    </Browser>
</root>
```

Here, the object repository code is encoded in an Extensible Markup Language (XML) format in the test object file.

In some instances, the object repository code is stored in a test object file such that the test object file is a flat file or unstructured file, or a file having no hierarchy, such as a plain text file or a binary file. Therefore, the present invention enables transformation of a the complex internal structure of the test object repository comprising, hierarchy, UI maps, parameters and properties of test objects into a mere flat file or unstructured file, which can be easily read in a variety of technical platforms by the testing tool applications, thereby facilitating portability of the complex test objects across various platforms. Moreover, the system is configured for version control of the test object file, i.e., identifying modifications between two distinct test object files, or between versions of test object files and subsequently, automatically, modifying the test objects. For example, the system may determine that testing of a first functional feature by a first testing tool application using a test object file A did not function as expected or yielded errors, or ceased unexpectedly. The system may further determine that the testing the same first functional feature by the same first testing tool application using a test object file B was performed satisfactorily without errors. The system may then automatically compare both the test object files, identify the parameters/test objects in the test object file B that rendered the test satisfactory and automatically correct the code in the test object file A based on file B, either entirely automatically, or based on receiving a confirmation from the user.

Furthermore, the test object repository may be easily modified by the system, for example, (i) in real-time, based on inspecting the technology resource application (for example, by executing the technology resource application to ascertain current functionality/test object parameters or by analyzing its source code) and identifying modifications to the application and/or its functional features, or (ii) based on receiving instructions from the user. For example, the system, based on input from the user, via the interface 510, may create a new test object for the technology resource application to be tested, in a similar manner as described above. The system may then modify the test object repository having the existing objects, to augment the repository with the new object. Typically, modifying the test object repository comprises augmenting the object repository code with another new node associated with the new test object based on its object parameters. For example, the new object, via its query pointer path may be added to the code, such that the new node of the object is child of one or more of the existing nodes, or such that the new node is connected with the existing nodes. As another example, the system is configured to automatically inspect, either on a one-time, intermittent or periodic basis, the technology resource application, to identify the changes/modifications to the functional features and their properties/parameters, hierarchy and the like in the technology resource application, and automatically, and in real time, modify the rest object repository and the object repository code to reflect the changes (for example, by updating existing object parameters of the test object, creating new test objects, deleting existing objects, modifying hierarchy of objects, and the like, accurately and the real-time, without the need for manual intervention).

Subsequently, at block 306, the system may construct a first application test script associated with a first testing tool application, for example, based in input or test cases provided by the user. The first application test script is typically constructed in a technical programing language or in a platform compatible with the testing tool application being used. The first application test script comprises code for one or more test steps for testing the technology resource application using the first testing tool application, indicating the sequential operations to be performed for testing the functional feature of the technology resource application. In some embodiments, the test steps are typically associated with at least one of the one or more test objects of the object data repository, in that, the test steps of the test script may reference (or invoke) the test object repository or one or more test objects of the repository.

Next, the system may determine one or more test data artifacts associated with testing the technology resource application, at block 308. In some embodiments, the system determines the test data artifacts/input medium based on parsing the test object repository and/or the test script. Continuing with the previous example regarding testing of an authentication functional feature of the technology resource application, the system may determine a set of first data artifacts comprising username test inputs and a set of second data artifacts comprising corresponding password test inputs. These sets of data artifacts may be stored in specific memory locations, for example, at the memory device 140, at the technology database 108, and/or the third party system 160. Furthermore, these sets of data artifacts may be stored as separate files or in a single file. For example, a plurality of the username and corresponding password artifacts, for a plurality of test runs, may be stored in a structured file or spreadsheet.

At block 310, the system may initiate, via the first testing tool application, testing of the technology resource application using the first application test script and the test object repository. In some embodiments, testing of the technology resource application typically comprises executing first application test script by parsing the one or more test objects from the test object repository and the associated test data artifacts into the first application test script based on the one or more test steps to test the technology resource application, as will be described in detail with respect to FIG. 4. In some embodiments, or in combination with the previous embodiments, the testing of the technology resource applications may be performed using a testing coordinator feature of the adaptive testing module 144. The testing coordinator feature of the adaptive testing module 144 which may be configured to test the operation of the functional feature or computerized process by initiating testing of a first technology resource application by a first testing tool application using the test data artifacts and a first set of test scripts and initiating testing of a second technology resource application by a second test tool application using the test data set/artifacts and a second set of test scripts from the selected test case. The testing coordinator feature is described in U.S. Pat. No. 9,317,411, which is incorporated by reference in its entirety.

FIG. 4 illustrates a high level process flow 400 configured for testing the technology resource application, in accordance with one embodiment of the invention. Some or all of the steps associated with the process flow 400 may be performed by the system 106 based on executing computer readable instructions associated with the adaptive testing module 144 (and/or other modules within the technology configuration system 106). As discussed previously, testing the technology resource application, typically involves, formulating a plurality of test cases, for example hundreds, thousands or tens of thousands of test cases. Each test case specifies a set of conditions under which the technology resource application is tested. Typically, the technology resource application is evaluated/tested under each of the plurality of test cases. Initiating testing of the technology resource application often comprises executing the test script under the conditions specified by the rest case, for each of the plurality of test cases. In some embodiments, the system transmits instructions to technology resources 150, such as a server farm, to cause the technology resources to carry out the plurality of test cases in parallel, thereby drastically reducing testing time. The results of the tests are transmitted back to the system for analysis, where the cumulative implications are analyzed.

The high level process flow 400 for testing the technology resource application, comprises, for each test case, executing the test script under the conditions specified by the test case. In this regard, the testing tool application parses each of the test steps of the application test script. For example, the testing tool application may parse a first test step of the one or more test steps associated with the first application test script, at block 402. The testing tool application may determine that the first test step references a first test object or a first test object repository. The testing tool application may then access the referenced test object repository and select the referenced test object node, for example, by using the query pointer path of the test object. The testing tool application may then parse the code to ascertain the object parameters of the first test object, and further determine the test data artifact associated with the test object. The testing tool application may then parse the object repository code into the test script for testing the application.

Based on parsing the object repository code into the test script, at block 404, the system may access and retrieve, from a first memory location, a first test data artifact of the one or more test data artifacts associated with the first test object. For example, the testing tool application may retrieve a set of username and password artifacts for testing the authentication feature. Next, at block 406, the system may test the technology resource application by providing the first data artifact as an input to a first functional feature of the technology resource application. For example, the testing tool application may locate the username input test object on the graphical user interface and provide the username artifact as an input. Similarly, the testing tool application may then execute the second test step and subsequently provide the corresponding password artifact as an input to the password input test object. Based on the next test step, the testing tool application may then select a confirm button object of the interface.

At block 408, in response to testing the technology resource application, the system and/or the testing tool application is configured to determine a first test output provided by the technology resource application. For example, the system may determine whether the application provides the correct output for the test, for example the application may determine whether the technology resource application is initiating the presentation of a predetermined user interface based on successful validation of the username/password artifact, whether a predetermined error message/interface is presented on unsuccessful validation, whether the technology resource application is validating the credentials correctly, and the like. The testing tool application may then generate a testing report for the plurality of test cases or for individual test cases, based on the outputs.

In addition and as alluded to previously, in some embodiments, the system may receive an indication from a user to migrate from a first testing tool, associated with a first technical platform, to a second testing tool associated with a second technical platform, and initiate testing of the technology resource application using the second testing tool application. In response, the system may construct a second application test script associated with the second testing tool application, for example based on receiving instructions from the user. Here, constructing the second application test script merely involved transforming the one or more test steps of the first application test script into a format associated with the second technical platform, without having to re-encode the functional features of the technology resource application. The system may then easily initiate testing of the technology resource application, via the second testing tool application, using the second application test script and previously created the test object repository and the associated test data artifacts, created for the first testing tool application, in the same manner as described above. Accordingly, the computerized system, computerized method and the computer program product of the present invention provide an adaptive testing framework for testing of a technology resource application using multiple testing tool applications, and specifically, by facilitating portability of test objects associated with the technology resource application across the multiple testing tool applications, as described above.

FIG. 5 illustrates a user interface 500 of the test asset manager interface presented by the adaptive application testing module, in accordance with one embodiment of the invention. Specifically, FIG. 5 illustrates a new object interface 510 that facilitates creation of new test objects by the user, as discussed with respect to process flow 300, in accordance with one embodiment of the invention. The system may initiate, via a display device of a user device, the presentation of a test asset manager interface, and specifically the new object interface 510, on the user device. The system may then receive, via the test asset manager interface, the one or more test objects associated with the technology resource application from a user. Here the system may receive one or more object parameters for the one or more test objects, such as the primary parameters of test object name 522, the test object class 524, and the test object type 526. The system may then formulate, automatically, a unique identifier and/or a query pointer path for the each of the test objects and display them along with other location properties 532. The system may display other secondary parameters such as location properties 532 of the test objects that describe the position, function, and configuration and other details of the test objects of the functional feature in the graphical user interface. The one or more secondary object parameters associated with location properties of the first functional feature of the technology resource application associated with the first test object may comprise a cascading sheet style (CSS) parameter, an element tag name parameter, a link text parameter, a partial link text parameter, a class name parameter, and/or the like. Furthermore, secondary object parameters may also include user interface map details/definitions 534, values and the like of the graphical user interface of the functional feature, such as a key parameter, a default value parameter, a category parameter, an information parameter, and or the like.

New test objects may be added using the interface 510, either before or after construction of test scripts, and existing objects may be modified in a similar manner. Here, the system automatically modifies the test object repository with the new test object, by modifying the object repository code in the test object file. In the event the user seeks to add new test objects after the creation of the script, the system is configure to modify the test object repository and the test script.

FIG. 6 illustrates a test object repository management interface 600 of the test asset manager interface presented by the adaptive application testing module, in accordance with one embodiment of the invention. The system may initiate, via a display device of a user device, the presentation of a test asset manager interface, and specifically the test object repository management interface 600, on the user device. The test object repository management interface 600 enables the user to view, modify and add test objects, in an integrated manner. Specifically, the system may display, via the test object repository management interface 600, the created test objects 610 (such as, test objects 1-5), for example, in a format/manner to facilitate visualization of their hierarchy. As shown in FIG. 5 with respect to test object 3, the system enables the user to select one or more objects in the test object display 610. Selection of the test object typically causes a display of test object parameters and details 630 associated with the selected test object. Similar to the interface 500, the system may display the test object name 522, the object class 524, the test object type 526, secondary parameters such as location properties 532, user interface map details 534 and other details, in the display 630. The test object detail display 630 may further allow modification of object details and parameters. Furthermore, the system is configured to log, in real time, one or more actions performed by the user via the test asset manager interface. This log with the one or more actions may be displayed on the interface as indicated by 640.

In some embodiments, the test object repository management interface 600 of the test asset manager interface presented by the adaptive application testing module comprises a test object grid (not illustrated) displaying the one or more test objects 610 and their details, and parameters 630, in a grid or table format. The test object grid facilitates cloning or copying of properties/parameters of a set (one or more) objects at the same time, and attributing them to another set of objects. The test object grid further facilitates modification of properties/parameters of a plurality of test objects at the same time. Furthermore, the test object grid facilitates modification or hierarchy of the object and object families, at the same time. For example, the test object grid facilitates elevation of the parent test object 2 to a browser object class. The system may then elevate the classes of one or more of the child test objects 3-5 automatically, and/or may facilitate changes to the parent object without changing the child objects. The system may then automatically modify the object repository code to reflect the new hierarchy of nodes the logical structure of the object repository code.

Therefore, the adaptive application testing framework of the present invention and the test asset manager interface in particular, facilitates construction, modification, search and management of the test objects and the object repository in an integrated manner, easily, without requiring extensive technical expertise of the user. Furthermore, the test asset manager interface facilitates construction of the objects, untethered from the test script, even before the technology resource application is available for testing. In addition, the test asset manager interface facilitates search and identification of test objects without requiring time consuming sequential/manual searching. Furthermore, the test asset manager interface and the adaptive application testing module/framework facilitates addition and/or creation of tandem-UI map specific details without requiring individual creation.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F3.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computerized system for testing a technology resource application, wherein the computerized system provides an adaptive application testing framework configured for testing of the technology resource application using multiple testing tool applications by facilitating portability of test objects associated with the technology resource application across the multiple testing tool applications, comprising:
a computer apparatus including at least one processor, at least one memory device, and a network communication device; and
an adaptive application testing module stored in the at least one memory device comprising computer readable instructions, that when executed by the at least one processor, cause the at least one processor to:
retrieve, from the at least one memory device, a functional feature of a technology resource application stored in the at least one memory device, wherein the functional feature is an operational element of the technology resource application;
create one or more test objects associated with the functional feature of the technology resource application, wherein creating the one or more test objects comprises creating a query pointer path for each of the one or more test objects;
construct, automatically, a test object repository for the one or more test objects, wherein constructing the test object repository comprises constructing an object repository code, in a test object file, comprising the one or more test objects as nodes in a logical structure of the object repository code, wherein the query pointer paths of the one or more test objects are configured for selection of the nodes within the test object file;
construct a first application test script associated with a first testing tool application, wherein the first application test script comprises code for one or more test steps for testing the technology resource application using the first testing tool application, wherein each of the one or more test steps are associated with at least one test object of the one or more test objects for testing the functional features of the technology resource application;
determine one or more test data artifacts associated with testing the technology resource application, wherein the one or more test data artifacts are associated with the one or more test objects; and
initiate, via the first testing tool application, testing of the technology resource application using the first application test script and the test object repository, wherein testing of the technology resource application comprises executing first application test script by parsing the one or more test objects from the test object repository and the associated test data artifacts into the first application test script based on the one or more test steps to test the technology resource application.

2. The system of claim 1, wherein initiating, via the first testing tool application, the testing of the technology resource application, further comprises:
   parsing a first test step of the one or more test steps associated with the first application test script;
   determining a first test object of the one or more test objects referenced by the first test step;
   retrieving, from a first memory location, a first test data artifact of the one or more test data artifacts associated with the first test object;
   testing the technology resource application by providing the first data artifact as an input to the functional feature of the technology resource application based on selecting the first test object node in the object repository code using the query pointer path; and
   in response to testing the technology resource application, determining a first test output provided by the technology resource application.

3. The system of claim 2, wherein initiating, via the first testing tool application, the testing of the technology resource application further comprises generating a testing report for the technology resource application based on the first test output.

4. The system of claim 1, wherein executing the computer readable instructions further cause the at least one processor to:
   determine a plurality of test cases for testing the technology resource application, wherein the plurality of test cases are associated with the first application test script;
   executing, automatically, via an execution medium, the plurality of test cases for testing the technology resource application, in parallel; and
   generating a testing report based on the execution of the plurality of test cases.

5. The system of claim 1, wherein the first testing tool application is associated with a first technical platform, wherein the first application test script comprising the one or more test steps is associated with the first technical platform, wherein executing the computer readable instructions further cause the at least one processor to:
   receive an indication to initiate testing of the technology resource application using a second testing tool application, wherein the second testing tool application is associated with a second technical platform;
   construct a second application test script associated with the second testing tool application, wherein constructing the second application test script comprises transforming the one or more test steps of the first application test script into a format associated with the second technical platform; and
   initiate, via the second testing tool application, testing of the technology resource application using the second application test script, the test object repository and the associated test data artifacts.

6. The system of claim 1, wherein the object repository code is encoded in an Extensible Markup Language (XML) format in the test object file.

7. The system of claim 1, wherein creating the one or more test objects associated with the technology resource application, further comprises:
   receiving an indication to create a first test object of the one or more test objects for testing the functional feature of the technology resource application;
   determining a first unique identifier for the first test object;
   determining one or more object parameters for the first test object;
   constructing a first query pointer path associated with the first test object based at least on the first unique identifier; and
   constructing the test object repository comprising the first test object, wherein constructing the test object repository comprises constructing the object repository code with a first node associated with the first test object based on the one or more object parameters of the first test object and the first query pointer path.

8. The system of claim 7, wherein the adaptive application testing module further comprises instructions that cause the at least one processor to:
   receive an indication to create a second test object of the one or more test objects for testing a first functional feature of the technology resource application, wherein the second object is associated with a child class of the first test object;
   determine a second unique identifier for the second test object;
   determine one or more object parameters for the second test object comprising a child class parameter of one or more object parameters;
   construct a second query pointer path associated with the second test object based at least on the second unique identifier; and
   modify the test object repository to comprise the first test object and the second test object, wherein modifying the test object repository comprises augmenting the object repository code with a second node associated with the second test object such that the second node is child of the first node.

9. The system of claim 7, wherein the one or more object parameters comprise a class parameter and an object type parameter.

10. The system of claim 9, wherein the object type parameter comprises a web edit object type, a web button object type, a web list object type, a web area object type, a checkbox object type, a radio group object type, and a web table object type.

11. The system of claim 7, wherein the one or more object parameters are associated with location properties of the functional feature of the technology resource application associated with the first test object, wherein the one or more object parameters comprise a cascading sheet style (CSS) parameter, an element tag name parameter, a link text parameter, a partial link text parameter, and a class name parameter.

12. The system of claim 7, wherein the one or more object parameters are associated with user interface properties of the functional feature of the technology resource application associated with the first test object, wherein the one or more object parameters comprise a key parameter, a default value parameter, a category parameter, and an information parameter.

13. The system of claim 1, wherein the adaptive application testing module further comprises instructions that cause the at least one processor to:
   initiate, via a display device of a user device, a presentation of a test asset manager interface on the user device;

receive, via the test asset manager interface, the one or more test objects associated with the technology resource application from a user, wherein receiving the one or more test objects further comprises receiving one or more object parameters for the one or more test objects;

display, via the test asset manager interface, the query pointer path for each of the one or more test objects; and display, via the test asset manager interface, the test object repository comprising the one or more test objects.

14. The system of claim 13, wherein the adaptive application testing module further comprises instructions that cause the at least one processor to:

receive, via the test asset manager interface, an indication to add a new test object to the test object repository from the user; and modify the test object repository to comprise the one or more test objects and the new test object, wherein modifying the test object repository comprises modifying the object repository code in the test object file.

15. The system of claim 13, wherein the test asset manager interface is configured to allow the user to search the test object repository for a first object of the one or more objects.

16. The system of claim 13, wherein the adaptive application testing module further comprises instructions that cause the at least one processor to:

receive, via the test asset manager interface, an indication to modify a first test object of the one or more test objects from the user; and modify the test object repository based on the indication from the user, wherein modifying the test object repository comprises modifying the object repository code in the test object file.

17. The system of claim 13, wherein the adaptive application testing module further comprises instructions that cause the at least one processor to:

log, in real time, one or more actions performed by the user via the test asset manager interface; and display, via the test asset manager interface, the logged one or more actions.

18. A computer program product for testing a technology resource application, wherein the computer program product is configured for testing of the technology resource application using multiple testing tool applications by facilitating portability of test objects associated with the technology resource application across the multiple testing tool applications, comprising a non-transitory computer-readable storage medium having computer-executable instructions to:

retrieve, from the at least one memory device, a functional feature of a technology resource application stored in the at least one memory device, wherein the functional feature is an operational element of the technology resource application;

create one or more test objects associated with the functional feature of the technology resource application, wherein creating the one or more test objects comprises creating a query pointer path for each of the one or more test objects;

construct, automatically, a test object repository for the one or more test objects, wherein constructing the test object repository comprises constructing an object repository code, in a test object file, comprising the one or more test objects as nodes in a logical structure of the object repository code, wherein the query pointer paths of the one or more test objects are configured for selection of the nodes within the test object file;

construct a first application test script associated with a first testing tool application, wherein the first application test script comprises code for one or more test steps for testing the technology resource application using the first testing tool application, wherein each of the one or more test steps are associated with at least one test object of the one or more test objects for testing the functional features of the technology resource application;

determine one or more test data artifacts associated with testing the technology resource application, wherein the one or more test data artifacts are associated with the one or more test objects; and initiate, via the first testing tool application, testing of the technology resource application using the first application test script and the test object repository, wherein testing of the technology resource application comprises executing first application test script by parsing the one or more test objects from the test object repository and the associated test data artifacts into the first application test script based on the one or more test steps to test the technology resource application.

19. A computerized method for testing a technology resource application, wherein the computerized method is configured for testing of the technology resource application using multiple testing tool applications by facilitating portability of test objects associated with the technology resource application across the multiple testing tool applications, comprising:

retrieving, from the at least one memory device, a functional feature of a technology resource application stored in the at least one memory device, wherein the functional feature is an operational element of the technology resource application;

creating one or more test objects associated with the functional feature of the technology resource application, wherein creating the one or more test objects comprises creating a query pointer path for each of the one or more test objects;

constructing, automatically, a test object repository for the one or more test objects, wherein constructing the test object repository comprises constructing an object repository code, in a test object file, comprising the one or more test objects as nodes in a logical structure of the object repository code, wherein the query pointer paths of the one or more test objects are configured for selection of the nodes within the test object file;

constructing a first application test script associated with a first testing tool application, wherein the first application test script comprises code for one or more test steps for testing the technology resource application using the first testing tool application, wherein each of the one or more test steps are associated with at least one test object of the one or more test objects for testing the functional features of the technology resource application;

determining one or more test data artifacts associated with testing the technology resource application, wherein the one or more test data artifacts are associated with the one or more test objects; and initiating, via the first testing tool application, testing of the technology resource application using the first application test script and the test object repository, wherein testing of the technology resource application comprises executing first application test script by parsing the one or more test objects from the test object repository and the associated test data artifacts into the first application test script based on the one or more test steps to test the technology resource application.

20. The computerized method of claim 19, wherein the first testing tool application is associated with a first technical platform, wherein the first application test script comprising the one or more test steps is associated with the first technical platform, wherein the method further comprises:
- receiving an indication to initiate testing of the technology resource application using a second testing tool application, wherein the second testing tool application is associated with a second technical platform;
- constructing a second application test script associated with the second testing tool application, wherein constructing the second application test script comprises transforming the one or more test steps of the first application test script into a format associated with the second technical platform; and
- initiating, via the second testing tool application, testing of the technology resource application using the second application test script, the test object repository and the associated test data artifacts.

\* \* \* \* \*